(12) United States Patent
Tillotson et al.

(10) Patent No.: US 8,904,880 B1
(45) Date of Patent: Dec. 9, 2014

(54) METHODS AND SYSTEMS FOR LOW-COST AERIAL RELAY

(75) Inventors: Brian J. Tillotson, Kent, WA (US); Keith J. Glover, Kent, WA (US)

(73) Assignee: The Boeing Company, Chicago, IL (US)

( * ) Notice: Subject to any disclaimer, the term of this patent is extended or adjusted under 35 U.S.C. 154(b) by 540 days.

(21) Appl. No.: 13/272,391

(22) Filed: Oct. 13, 2011

(51) Int. Cl.
*G01F 1/66* (2006.01)

(52) U.S. Cl.
USPC ............... 73/861.25; 701/16; 73/861.28

(58) Field of Classification Search
USPC ............... 701/16; 73/861.25, 861.28
See application file for complete search history.

(56) References Cited

U.S. PATENT DOCUMENTS

| | | | |
|---|---|---|---|
| 4,716,417 A * | 12/1987 | Grumet | 343/708 |
| 2003/0164794 A1 | 9/2003 | Haynes et al. | |
| 2006/0054737 A1 * | 3/2006 | Richardson | 244/17.11 |
| 2008/0102814 A1 * | 5/2008 | Chari et al. | 455/424 |
| 2009/0055038 A1 * | 2/2009 | Garrec et al. | 701/17 |
| 2009/0135074 A1 * | 5/2009 | Yang et al. | 343/766 |
| 2009/0311046 A1 * | 12/2009 | Velsor | 404/95 |
| 2010/0045512 A1 * | 2/2010 | Nelson | 342/25 A |
| 2010/0283988 A1 * | 11/2010 | Mosier et al. | 356/4.01 |
| 2010/0299067 A1 * | 11/2010 | McCollough et al. | 701/301 |
| 2011/0134249 A1 * | 6/2011 | Wood et al. | 348/164 |
| 2011/0221934 A1 * | 9/2011 | Simon et al. | 348/240.3 |
| 2011/0307126 A1 * | 12/2011 | Hogstrom | 701/16 |
| 2013/0103232 A1 * | 4/2013 | Griffith | 701/2 |

* cited by examiner

*Primary Examiner* — Dominic E Rego
(74) *Attorney, Agent, or Firm* — Armstrong Teasdale LLP

(57) ABSTRACT

A method for relaying a radio signal between two points having an obstacle therebetween is described. The method includes maintaining an unmanned aerial vehicle (UAV) in an orientation with respect to the two points, the UAV having at least one passive reflective device having an elongated configuration thereon, transmitting a signal from one of the two points, the transmitted signal impinging the at least one passive reflective device, and receiving the signal at the other of the two points, the received signal being a signal reflected from the at least one passive reflective device.

20 Claims, 18 Drawing Sheets vertical
polarization typical
polarization horizontal polarization vertical polarization

US 8,904,880 B1

METHODS AND SYSTEMS FOR LOW-COST AERIAL RELAY

BACKGROUND

The field of the disclosure relates generally to ground to ground radio communication issues with intervening obstacles between terminals, and more specifically, to methods and systems for a low-cost aerial relay.

A continuing problem is the enablement of ground to ground radio communication despite intervening obstacles such as mountains or buildings that block radio signals. In certain cases, an aerial system is ideal to relay the signal from one party to another. For example, unmanned aerial vehicles (UAVs) incorporating electronic repeaters are used for high-value communication channels at echelons above the brigade or company level. However, electronic repeaters as UAV payloads can be heavy, power hungry, and expensive. These disadvantages make UAV repeaters unsuitable for everyday use at company or platoon level or for civil needs like police, fire, or border patrol.

One previous solution to the general problem includes therefore, electronic repeaters as payloads in UAVs as mentioned above. Other solutions include stationary repeater units placed on mountaintops or the roofs of buildings and/or radio reflecting satellites, such as NASA's Echo I. It would be desirable to achieve the benefits of an unmanned aerial relay without the disadvantages associated with the above listed electronic repeaters.

BRIEF DESCRIPTION

In one aspect, a method for relaying a radio signal between two points having an obstacle therebetween is provided. The method includes maintaining an unmanned aerial vehicle (UAV) in an orientation with respect to the two points, the UAV having at least one passive reflective device having an elongated configuration thereon, transmitting a signal from one of the two points, the transmitted signal impinging the at least one passive reflective device, and receiving the signal at the other of the two points, the received signal being a signal reflected from the at least one passive reflective device.

In another aspect, an unmanned aerial vehicle (UAV) is provided that includes at least one passive reflective device having an elongated configuration thereon defining a long axis and comprising a material configured to reflect radio signals, and a control system to control flight control surfaces of the UAV such that the UAV has a flight pattern that orients the at least one passive reflective device such that the long axis lies on an ellipsoid whose foci are at two points between which radio communications are desired.

In still another aspect, a communications system is provided that includes a first radio transceiver operable for deployment at a first point, a second radio transceiver operable for deployment at a second point, and an unmanned aerial vehicle (UAV) that includes at least one passive reflective device having an elongated configuration. The at least one passive reflective device defines a long axis and includes a material configured to reflect radio signals. The unmanned aerial vehicle is operable to maintain an orientation of the at least one passive reflective device with respect to the first radio transceiver and the second radio transceiver.

In yet another aspect, a method is provided that includes transmitting a radio signal from a first point, the radio signal intended for reception at a second point, an obstacle to radio signals between the first point and the second point, orienting at least one passive reflective device having an elongated configuration with respect to the first point and the second point using an unmanned aerial vehicle, reflecting the radio signal with the at least one passive reflective device, and receiving the radio signal at the second point.

The features, functions, and advantages that have been discussed can be achieved independently in various embodiments or may be combined in yet other embodiments further details of which can be seen with reference to the following description and drawings.

DETAILED DESCRIPTION

The embodiments described herein relate to a low-cost airborne relay for radio-frequency communication, where an unmanned aerial vehicle (UAV) reflects radio signals between two terminals. As described herein, the UAV is configured with one of more features that enhance RF reflection in selected orientations. Further, the UAV may be configured to fly one or more paths that optimize bistatic signal strength between the two terminals. In at least one embodiment, the features added to the UAV include passive RF reflectors, which in combination with special operating methods, serve as relays between terminals on the ground. The incorporation of passive RF reflectors reduces weight, power, electromagnetic interference (EMI), and costs, thereby allowing UAVs to be used as relays at lower military echelons and in civilian applications.

A simple physical embodiment of the system is first described herein, then an overview of a general method for using the system is described. Also described are the physics that enable the method, and finally specific methods corresponding to particular classes of applications are described.

Figure 1:
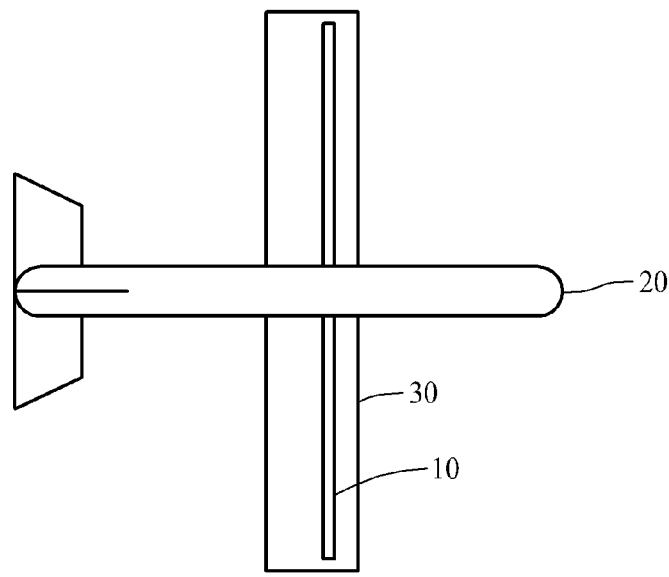
FIG. 1 illustrates a passive reflective device mounted on an underside of a wing of an unmanned aerial vehicle (UAV).

As shown in FIG. 1, a passive reflective device 10 is mounted on an unmanned aerial vehicle (UAV) 20. In the particular embodiment illustrated, the passive reflective device 10 is mounted an underside of a wing 30 of the UAV 20. Now referring to FIG. 2, passive reflective device 10 operates as a relay for a signal 50 that is to be transmitted from point A to point B. The use of the passive reflective device 10 allows signal 50 to circumvent an obstacle 60 between points A and B. In embodiments, the passive reflective device 10 is at least one elongated conductive strip, plate, or wire, with its long axis oriented parallel to the wing and with the specific material for the passive reflective device 10 selected to reflect radio-frequency signals. The passive reflective device 10 may serve additional functions, such as providing structural stiffness to the wing 30 of the UAV 20. Embodiments are contemplated in which the passive reflective device 10 is mounted substantially parallel to a fuselage of the UAV 20. The flight patterns of such an embodiment are modified to be consistent with the flight pattern embodiments described herein.

Figure 3:
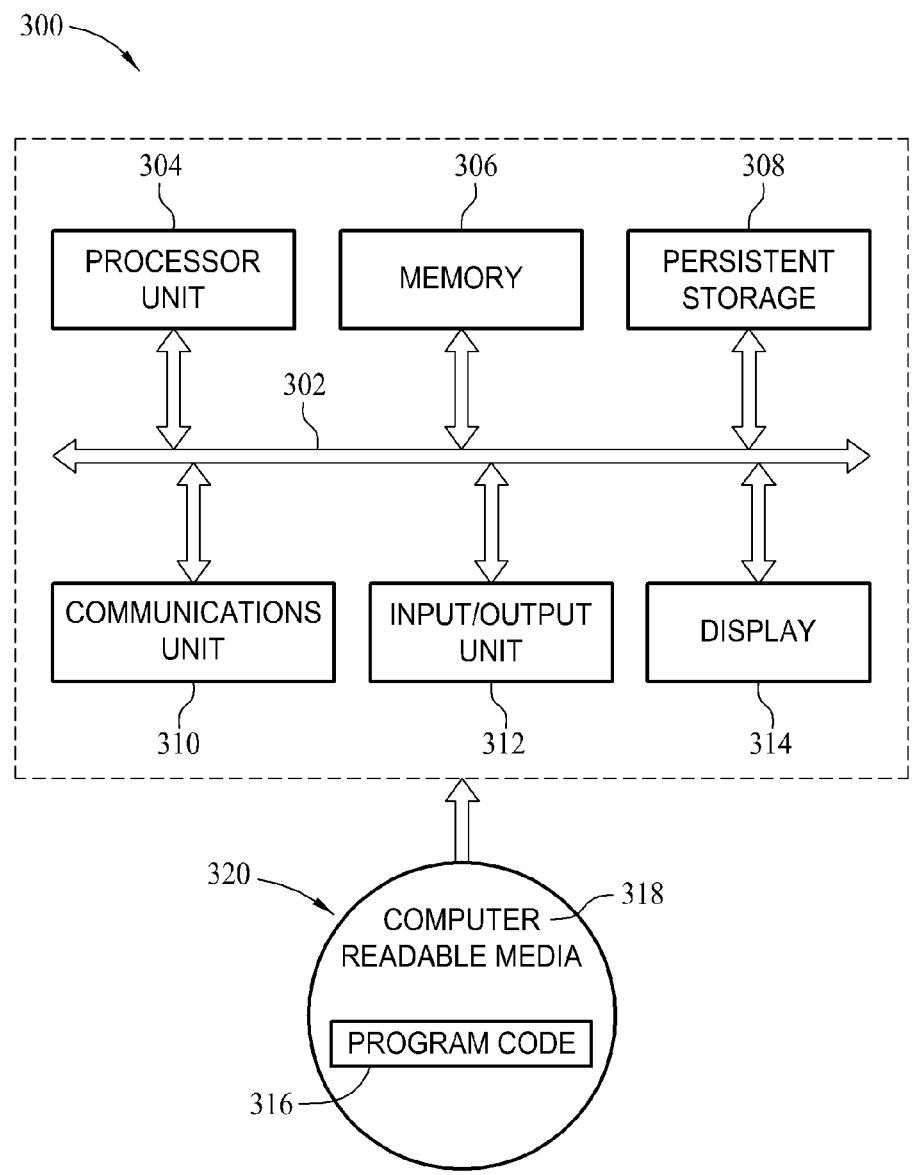
FIG. 3 is a block diagram of a data processing system.

Further embodiments relate to a control system that controls a flight path and orientation of the UAV 20 in accordance with the methods described in the following paragraphs. Initially, however, such a control system may be embodied as a data processing system 300 which is depicted in FIG. 3 in accordance with an illustrative embodiment. In this illustrative example, data processing system 300 includes communications fabric 302, which provides communications between processor unit 304, memory 306, persistent storage 308, communications unit 310, input/output (I/O) unit 312, and may include a display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Generally, the control system includes a computer configured to control flight control surfaces of the UAV 20, (e.g., ailerons, rudder, and elevator) and possibly a throttle of the UAV 20. The computer typically is programmed to know the locations of points A and B (and others), and is configured to receive updates of the location and orientation of UAV 20 from elements such as a UAV navigation system, an air traffic radar system, or other systems that provide one or both of location and orientation information.

Alternatively, the control system may be embodied as a skilled human operator with a control console, a radio link to the UAV, and a source of up-to-date information about locations of points A and B and the location and orientation of the UAV 20.

Figure 2:
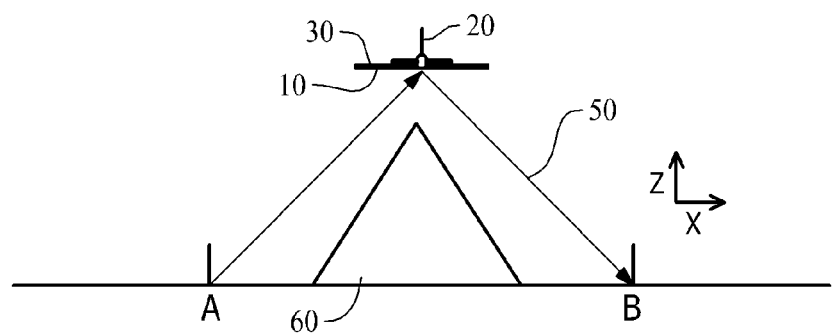
FIG. 2 illustrates the passive reflective device operating as a relay for a signal that is to be transmitted from point A to point B.

Referring again to FIG. 2, the UAV 20 flies a path that makes it visible (by radio) to points A and B. For example, no RF obstacles block the line of sight from point A to the UAV 20 or from the UAV 20 to point B, as shown in FIG. 2. As the UAV 20 flies its pattern, a terminal on the ground associated with point A transmits an RF signal which impinges on the reflective device 10. The signal is scattered in many directions, including towards point B.

One preferred method of operating the UAV 20 ensures that the signal scattered toward point B is at least strong enough for it to be received at point B and be understood by the receiver at point B. How to do this depends on the shape and size of the reflective device, the polarization of the radio signal, the relative positions of points A and B, and the velocity of any wind that affects the UAV 20. Various embodiments provide methods to deal with these different situations.

Figure 4:
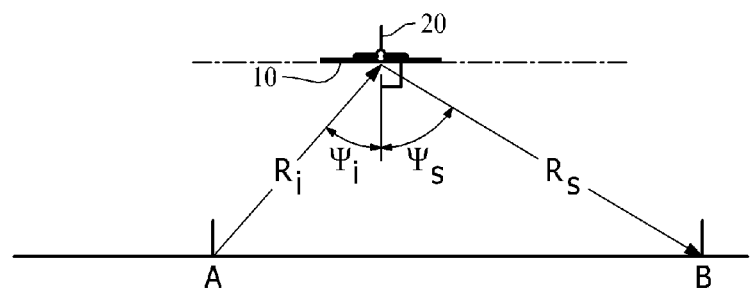
FIG. 4 illustrates range parameters $R_i$ and $R_s$ and angle parameters $\psi_s$ and $\psi_i$; from point A to the UAV to point B.

The power received by the receiver at point B is described by the formula, $P_{rcvr}=C/R_{eq}^2$, where C is a constant that depends on transmit power, antenna gains, and radio wavelength, and $R_{eq}$ is the "equivalent range" from point A to point B. The equivalent range is defined as $R_{eq}=R_iR_s(4\pi/\sigma)^{1/2}$, where, as shown in FIG. 4, $R_i$ is the range from Point A to the UAV 20 (i.e., range of incident radiation), $R_s$ is the range from the UAV 20 to Point B (i.e., range of scattered radiation), and $\sigma$ is the bistatic scattering cross-section of the reflective device 10 on the UAV 20.

The bistatic scattering cross-section depends on the wave number $k_0$ (which is inversely proportional to the radio wavelength) and on the geometry of the device. For illustration purposes, it is assumed that the reflective device 10 is a long, thin wire, for example, a wire stretched from wing tip to wing tip inside the plastic skin of UAV 20. The bistatic scattering cross-section, $\sigma$, of a wire scattering a plane wave is given by the following equation:

$$\sigma(\Psi_i, \Psi_s) = 4\pi h^2 \frac{\cos^2(\Psi_s)}{\cos^2(\Psi_i)} \cos^2(\gamma_i)\cos^2(\gamma_s) \left[\frac{1}{\ln^2(0.8905 k_o a) + \frac{\pi^2}{4}}\right]$$

$$\sin x^2 \{k_o h(\sin(\Psi_i) + \sin(\Psi_s))\}$$

where 2h is the length of the wire, a is the radius of the wire, $\Psi_s$ and $\Psi_i$ are directions of incident and scattered wave propagation relative to broadside (see FIG. 4), $\gamma_s$ and $\gamma_i$ are polarization of incident and scattered electric fields relative to wire axis, and sin $x(z)=\sin(z)/z$.

Figure 5:
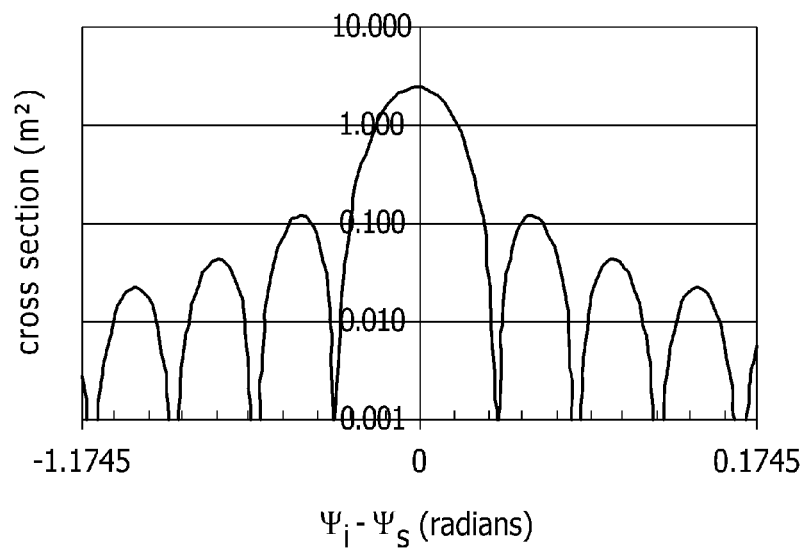
FIG. 5 illustrates variation of bistatic scattering cross-section, $\sigma$, with $\psi_s$ minus $\psi_i$; where each tick mark is one degree and the vertical scale is logarithmic.

FIG. 5 is an example of how $\sigma$ varies with $\Psi$. In most situations, the central peak occurs when $\Psi_i$ is within a degree or two of $-\Psi_s$, for example, when the waves are specularly reflected. In such cases, waves reflected from each point along the wire travel roughly the same total number of wavelengths from Point A to Point B so they interfere constructively at the receiving antenna. The first null occurs where $k_0 h (\sin(\Psi_i)+\sin(\Psi_s))=\pi$, that is, where waves reflected from each point along the wire are exactly half a wavelength out of phase with waves reflected from another point along the wire. They destructively interfere and cancel each other at the receiving antenna.

The described methods associated with this disclosure keep the wire (or other reflective device) positioned and oriented so that values of $\Psi_i$ and $\Psi_s$ stay near the central peak thereby maintaining strong reflections from Point A to Point B, and from Point B to Point A, for two-way communications links. At a minimum, the methods avoid values of $\Psi_i$ and $\Psi_s$ corresponding to nulls on either side of the central peak.

Figure 6:
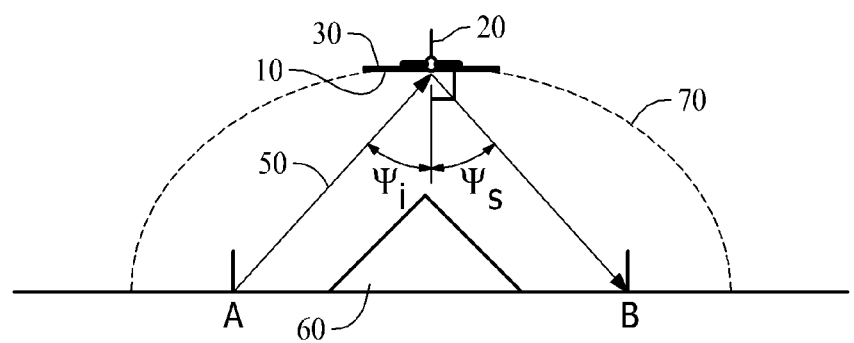
FIG. 6 illustrates that a reflection from a surface parallel to an ellipsoid ensures signal from one focus (A) reaches other focus (B).

$\Psi_i$ and $\Psi_s$ can be sufficiently optimized by orienting the UAV 20 so the long axis of the reflective device 10 lies on an ellipsoid whose foci are at Point A and Point B. If the device is two-dimensional, e.g., a plate rather than wire, then its short axis should also lie on the ellipsoid. Any ellipsoid has the property that a ray from either focus, reflecting specularly from the ellipsoid, will reach the other focus. Aligning the reflective device with the surface of the ellipsoid ensures that the signal from Point A undergoes a specular reflection toward Point B, corresponding to $\Psi_i=-\Psi_s$, as in FIG. 6 which illustrates a reflection from a surface parallel to an ellipsoid 70 ensuring signal 50 from one focus (point A) reaches other focus (point B).

The above paragraphs therefore describe a method for maintaining an UAV (i.e., the reflective device 10) in an orientation with respect to points A and B by maintaining the passive reflective device 10 in an orientation such that a product of a square of the cosine of a first angle between the reflective device 10 and a vertical incident polarization vector between the two points and a square of the cosine of a second angle between the reflective device 10 and a vertical scattered polarization vector between the two points is minimized.

Figure 7A:
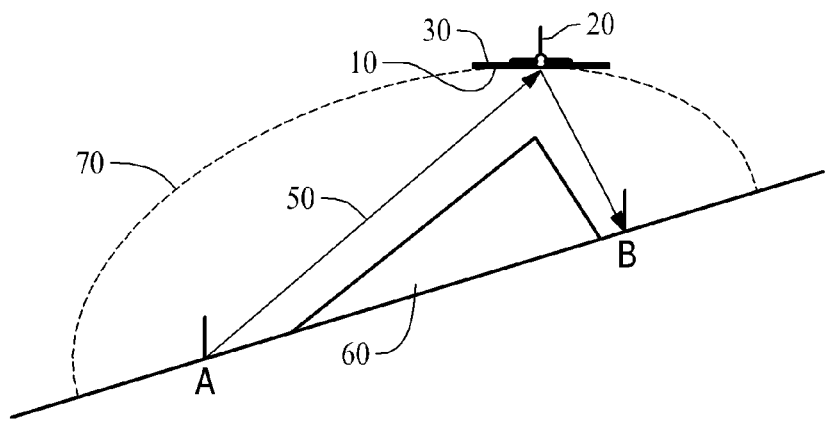
FIG. 7A illustrates a UAV positioned to minimize $R_A \times R_B$ while avoiding blockage of RF path and that the ellipsoid need not be horizontal.
Figure 7B:
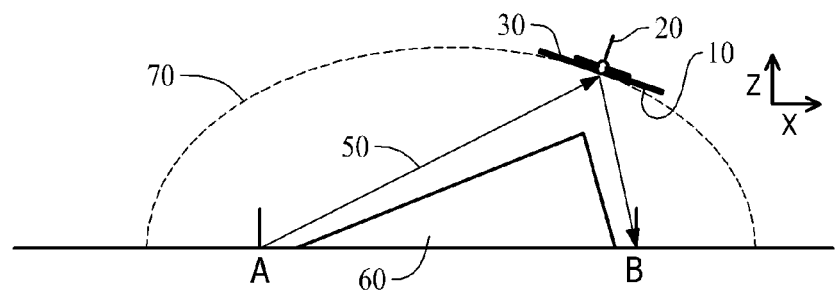
FIG. 7B illustrates a UAV positioned to minimize $R_A \times R_B$ while avoiding blockage of RF path and that the reflective device (and wing) of the UAV need not be horizontal.

The received power is further optimized by positioning the UAV 20 to minimize the equivalent range between points A and B, via the UAV, subject to the constraint of having a clear line of sight past any obstacles. Embodiments addressing this are shown in FIG. 7. Flying with a tilted wing 30 as FIG. 7B reduces aerodynamic efficiency, but may be an effective communication choice in some situations. Summarizing, FIG. 7 illustrates UAV 20 positioned to minimize the equivalent range while avoiding blockage of the RF path. FIG. 7A illustrates the ellipsoid 70 need not be horizontal. FIG. 7B illustrates that the reflective device 10 (and wing 30) need not be horizontal.

Figure 8:
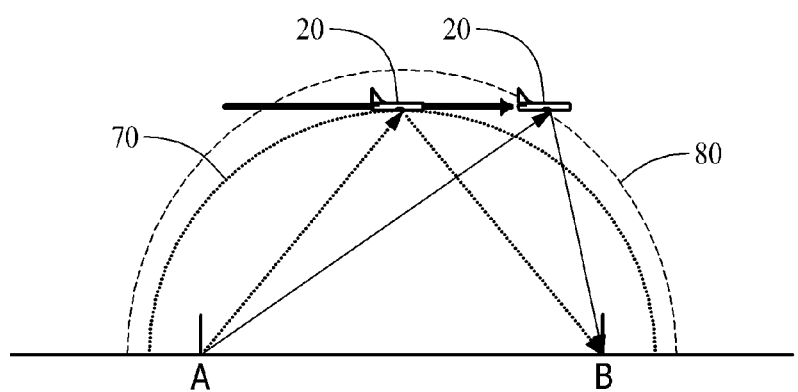
FIG. 8 illustrates the UAV shown flying a level path where at each point the passive reflective device is on the surface of a different ellipsoid with foci at points A and B.

Note that though "the ellipsoid" has been referred to herein, the term is local and ever-changing. Wherever the UAV 20 happens to be, there is exactly one ellipsoid which passes through a given point in the UAV 20 and which has points A and B as foci. The reflective device 10 should be oriented to lie on the surface of that local ellipsoid 70. As the UAV 20 moves to a new location, generally a different ellipsoid 80 will pass through the UAV 20 and have points A and B as foci, as illustrated in FIG. 8 where the UAV 20 is shown flying a level path. At each point, the UAV, or more correctly the passive reflective device 10, is on the surface of a different ellipsoid 70, 80 with foci at points A and B.

The general methods discussed thus far maintain the reflective device 10 lying within (or nearly within) the surface of an ellipsoid to give the best combination of angles $\Psi_i$ and $\Psi_s$. Specific methods are needed to deal with angles $\gamma_i$ and $\gamma_s$ which relate the RF electric field's polarization direction to the axis of the reflective device 10, which in one embodiment is a wire. The incident signal's electric field cannot induce a current in the wire if the field is perpendicular to the wire; it can only induce currents parallel to the electric field, hence the $\cos^2(\gamma_i)$ in the equation given above. Likewise, the induced current can only create a scattered electric field parallel to the current, hence the $\cos^2(\gamma_s)$ in equation given above. To optimize with respect to $\gamma$, polarization must be accounted for.

All radio transmissions are polarized. Any polarization mode can be described as a linear combination of horizontal, vertical, right-hand circular, or left-hand circular polarization. The best method of operating the UAV 20 depends on the polarization used. Three methods are described corresponding to polarization that is horizontal, vertical, or circular (whether right-hand or left-hand makes no difference for this level of description). Given these examples, persons skilled in the art will be able to derive best methods corresponding to polarizations that are a combination of horizontal and vertical. Likewise, although the equations used to describe reflective devices with different shapes (e.g., cylinders or rectangular plates) are different than the equation used herein, persons skilled in the art will be able to find or derive such equations and, using them, derive best methods to operate a UAV 20 equipped with those reflective devices.

Method for Horizontal Polarization

Figure 9A:
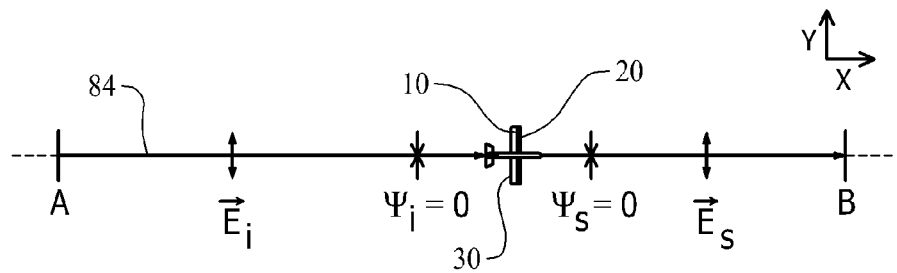
FIG. 9A is a top view of the UAV illustrating polarization vectors E of incident and scattered signals.
Figure 9B:
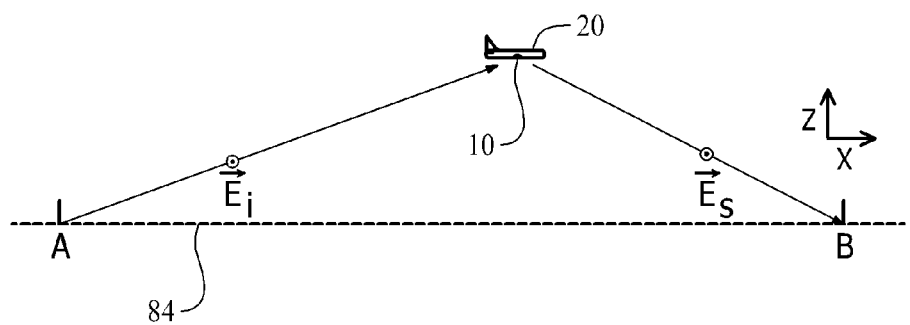
FIG. 9B is a side view of the UAV illustrating polarization vectors E of incident and scattered signals.
Figure 9C:
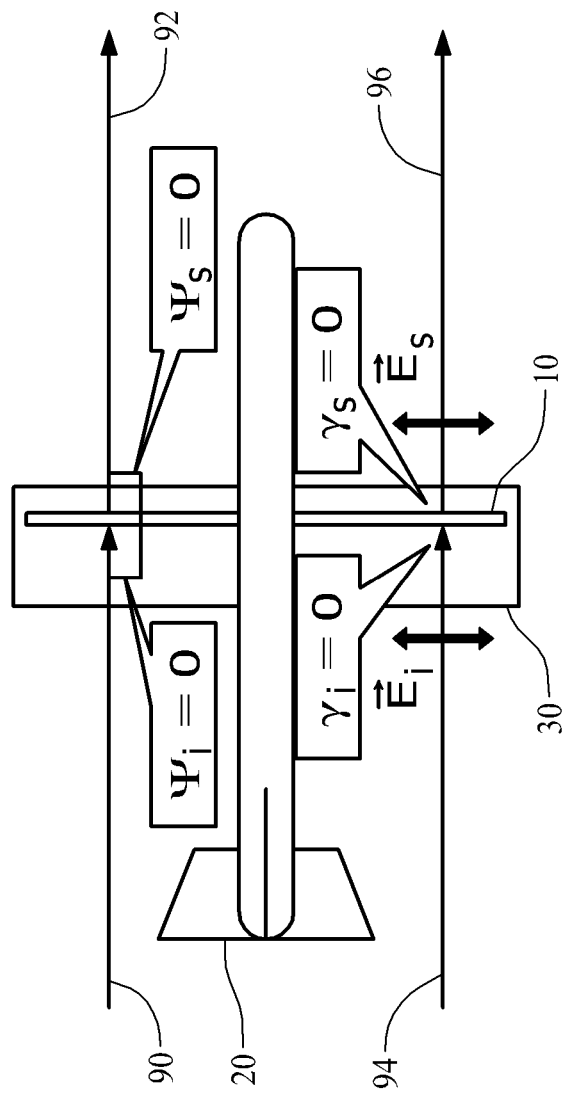
FIG. 9C is a close-up top view of polarization vectors E, propagation angles $\Psi$ relative to the passive reflective device axis, and polarization angles $\gamma$ relative to an axis of the reflective device.

For horizontal polarization, the long axis of the reflective device on the UAV 20 should be (a) horizontal to keep $\gamma_i$ and $\gamma_s$ near zero, and (b) perpendicular to A-B (the axis 84 from Point A to Point B) to keep $\Psi_i$ and $\Psi_s$ near zero. A simple example that satisfies this criterion is UAV 20 flying with wings 30 level, parallel to and directly above the A-B axis 84 as shown in FIGS. 9A and 9B. The incident and scattered rays are perpendicular to the wire axis, so $\Psi_i=\Psi_s=0$. Thus the $\Psi$-dependent parts of the equation given above are maximized. The horizontal electric field vector is parallel to the wire axis, so $\gamma_i=\gamma_s=0$. Thus the $\gamma$-dependent parts of the equation given above are maximized. Summarizing, FIG. 9A is a top view of UAV 20 illustrating polarization vectors E of incident and scattered signals. FIG. 9B is a side view, and FIG. 9C is a close-up top view of polarization vectors E, propagation angles $\Psi$ relative to wire axis, and polarization angles $\gamma$ relative to an axis of the reflective device 10. FIG. 9C further illustrates incident radiation 90 that is perpendicular to the reflective device 10, scattered radiation 92 that is perpendicular to the reflective device 10, incident polarization 94 that is parallel to the reflective device 10, scattered polarization 96 that is parallel to the reflective device 10.

Figure 10A:
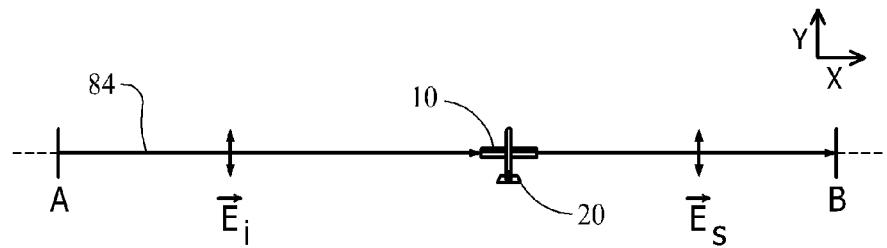
FIG. 10A is a top view showing polarization vector E of incident and scattered signals with the reflective device parallel to the AB axis.
Figure 10B:
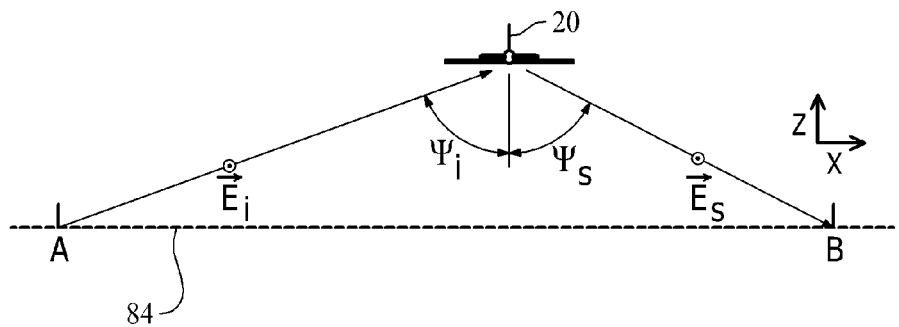
FIG. 10B is a side view showing polarization vector E of incident and scattered signals with the reflective device parallel to the AB axis.
Figure 10C:
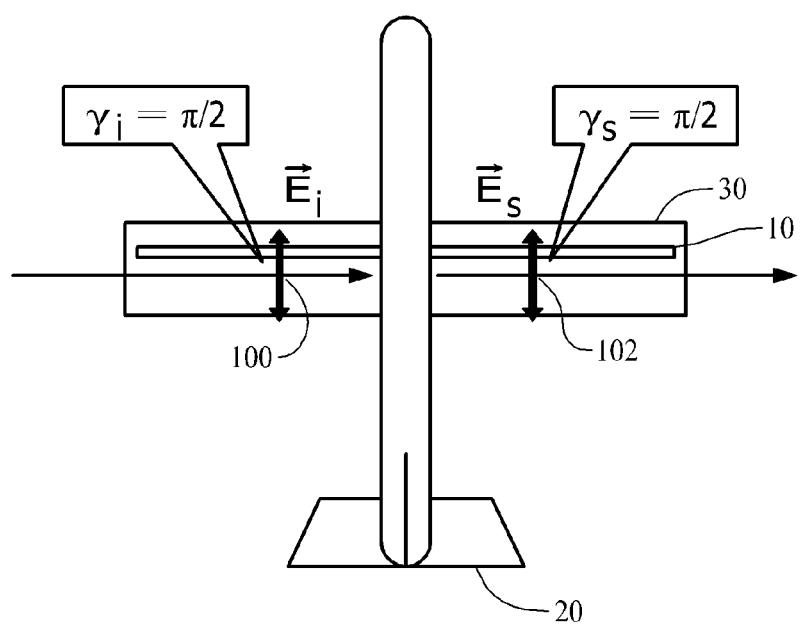
FIG. 10C is a close-up top view showing polarization vector E of incident and scattered signals with the reflective device parallel to the AB axis.

Contrast the above to a scenario where the UAV 20 flies perpendicular to the A-B axis 84 and directly above it as shown in FIG. 10. FIG. 10 represents is a counterexample, not an illustrative embodiment. Then in general, $\Psi_i \neq \Psi_s$ and both angles are far from zero, so the $\Psi$-dependent parts of the equation given above are small. Worse, the electric field vectors are perpendicular to the wire axis, so $\gamma_i=\gamma_s=\pi/2$. Thus the $\gamma$-dependent parts of equation 1 are zero. The scattering cross-section is zero and no signal reaches Point B. Summarizing, FIG. 10 is a counterexample to the described embodiments with the reflective device 10 parallel to the AB axis. FIG. 10A is a top view showing polarization vector E of incident and scattered signals. FIG. 10B is a side view and FIG. 10C is a close-up top view that illustrates incident radiation 100 that is perpendicular to the reflective device 10, scattered radiation 102 that is perpendicular to the reflective device 10.

Figure 11:
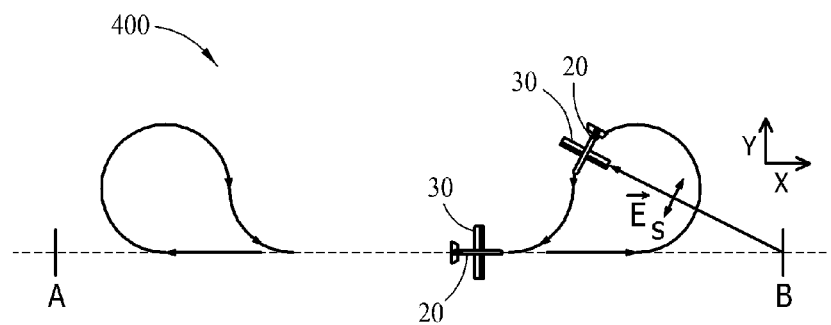
FIG. 11 is a top view of a race track pattern showing wings of the UAV perpendicular to electric field, E, during a turn.

Continuing the example of FIG. 9, the UAV 20 cannot fly forever in the same direction, lest it pass out of range of Point A's and Point B's radios. Therefore, the UAV 20 should eventually turn around and travel between Point A and Point B in the opposite direction. But if it does a conventional turn, there will be periods during the turn when the reflective device 10 is perpendicular to the incident or scattered electric field and no signal will reflect from Point A to Point B, as shown in FIG. 11, which is a top view of a race track pattern 400 showing wings 30 perpendicular to electric field, E, during a turn. At these times, communication from Point A to Point B will cease.

Figure 12A:
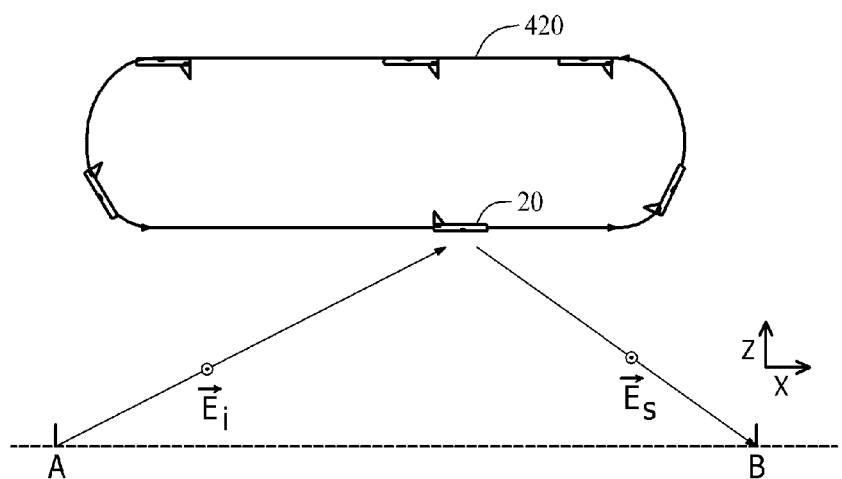
FIG. 12A is a side view that illustrates the UAV performing a half loop, pitching through 180°, and flying inverted along its return path.
Figure 12B:
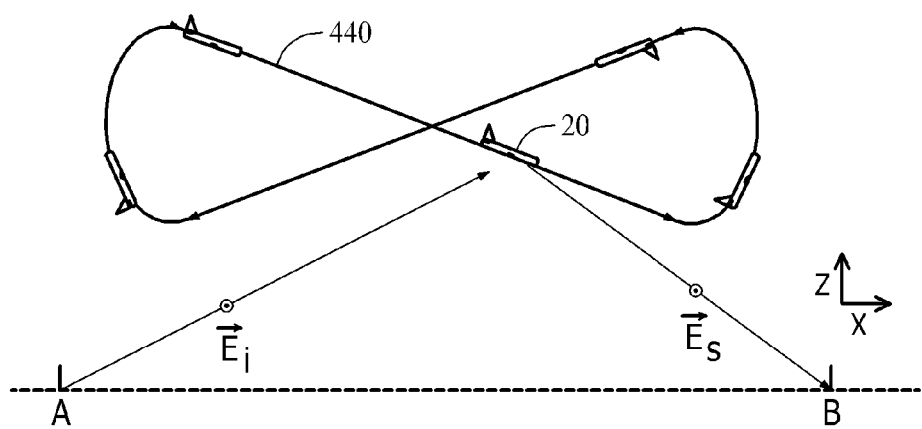
FIG. 12B is a side view that illustrates an alternative flight pattern where the UAV pitches in the same direction at both ends of its flight pattern.

To solve this problem, one embodiment calls for the UAV 20 to perform a half loop, pitching through 180° and flying inverted along its return path as shown in FIG. 12. At the other end of its pattern 420, UAV 20 performs another half loop and flies right side up. With this pattern, the reflective device 10 is always properly oriented to give the maximal reflection from Point A to Point B. FIG. 12A is a side view that illustrates that the UAV 20 pitches up at one end of its flight pattern and down at the other end of the flight pattern 420. FIG. 12B is a side view that illustrates that the UAV 20 pitches in the same direction at both ends of its flight pattern 440. Other embodiments may use such a FIG. 8 path, pitching the same direction (up or down) at both ends and climbing or descending along both paths as in FIG. 12B. Note that long-duration inverted flight is uncomfortable for human pilots, but not uncomfortable or difficult for many small UAVs. In either case, the passive reflective device 10 disposed in or on the wing 30 is always parallel to the horizontal E fields.

The examples discussed here are chosen for simplicity and clarity of illustration. The UAV 20 need not fly exactly parallel to the A-B axis, nor exactly above it, nor keep the UAV's wings exactly level. So long as $\Psi_i$ roughly equals $-\Psi_s$ and the wings are not close to vertical orientation, there will be good transmission from Point A to Point B.

Method for Vertical Polarization

Figure 13A:
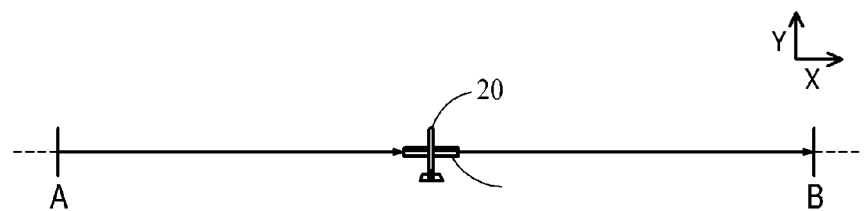
FIG. 13A is a top view that illustrates vertical polarization compensation by placing the reflective device at a position and orientation where it is at least partly aligned with the polarization vector.
Figure 13B:
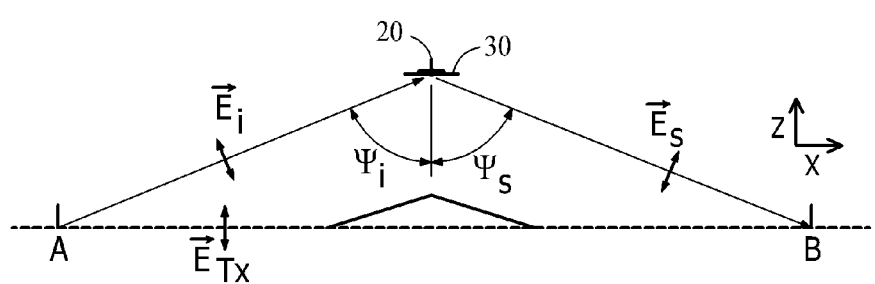
FIG. 13B is a side view that illustrates vertical polarization compensation by placing the reflective device at a position and orientation where it is at least partly aligned with the polarization vector.
Figure 13C:
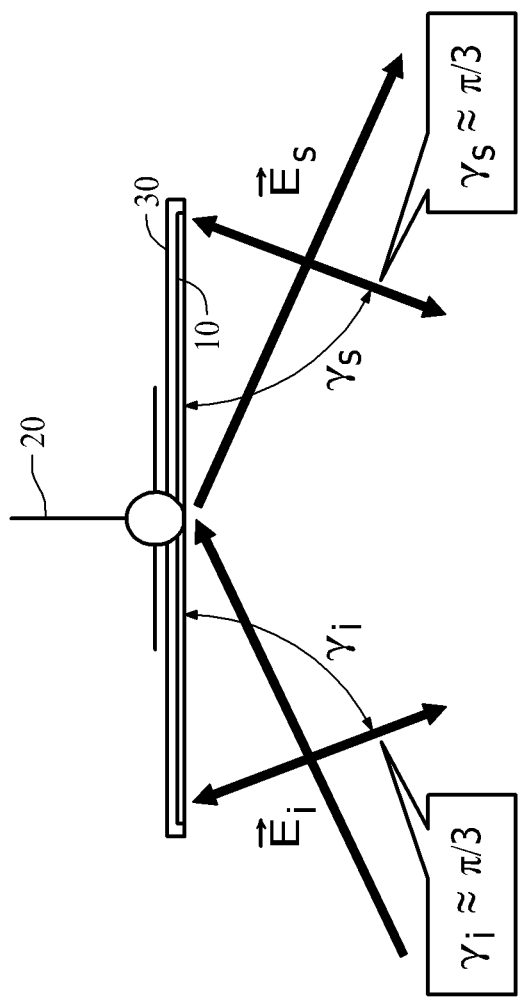
FIG. 13C is a close-up side view of polarization vectors E and polarization angles γ relative to the axis of the passive reflective device.

Most mobile military radios use vertical polarization, for example, the electric field at the transmitter oscillates in the vertical direction. To give optimal reflection, the long axis of the reflective device on the UAV 20 should be vertical (in addition, either Point A or Point B should be higher than the UAV 20). Such a configuration is not practical for a reflective device embedded in the wing of a UAV as the wing must be non-vertical at least some of the time to produce lift. Embodiments for vertical polarization compensate by placing the reflective device at a position and orientation where it is at least partly aligned with the polarization vector. An example is shown in FIG. 13 where FIG. 13A is a top view illustrating polarization vector E of incident and scattered signals. FIG. 13B is a side view and FIG. 13C is a close-up side view of polarization vectors E and polarization angles γ relative to the axis of the passive reflective device.

Like the embodiment for horizontal polarization, the wing 30 lies parallel to the surface of the ellipsoid which passes through the UAV 20 and has Point A and Point B at its foci. Unlike the embodiment for horizontal polarization, the UAV 20 flies perpendicularly across the Point A-to-Point B axis and stays between Point A and Point B, not flying directly over either of them. As shown, this orients the reflecting device so that $\Psi_i$ roughly equals $-\Psi_s$ and neither has a value very close to π/2. This ensures that the Ψ-dependent factors in the equation given above are not very small. More subtly, this orientation, together with the UAV's elevated position, ensures that $\gamma_i$ and $\gamma_s$ are substantially less than π/2. This ensures that the γ-dependent factors in the equation given above are not very small. The key to keeping angles $\gamma_i$ and $\gamma_s$ substantially less than π/2 is that the polarization vector, although nominally vertical at the transmit antenna, is perpendicular to the propagation direction at large distances from the transmitter. Thus the incident polarization vector $\vec{E}_i$ is tilted away from the vertical when it reaches the UAV 20, and is therefore not perpendicular to the axis of the passive reflective device 10. Likewise the scattered polarization vector $\vec{E}_s$ is tilted away from the vertical when it departs the UAV 20.

Contrast this to a case (not shown in the Figures) where the UAV 20 flies parallel to the AB axis, directly above it. Then $\gamma_i$ and $\gamma_s$ are both π/2, so the scattering cross-section is zero and no signal reaches Point B.

Continuing the example of FIG. 13, the UAV 20 cannot fly forever in the same direction, lest it pass out of range of Point A and Point B radios. Therefore, the UAV 20 should turn around and pass between Point A and Point B in the opposite direction. But if the UAV 20 does a conventional turn, there will be periods during the turn when the reflective device 10 is perpendicular to the incident or scattered electric field or when is quite different from $-\Psi_s$. At these times, communication from Point A to Point B will cease.

Figure 14A:
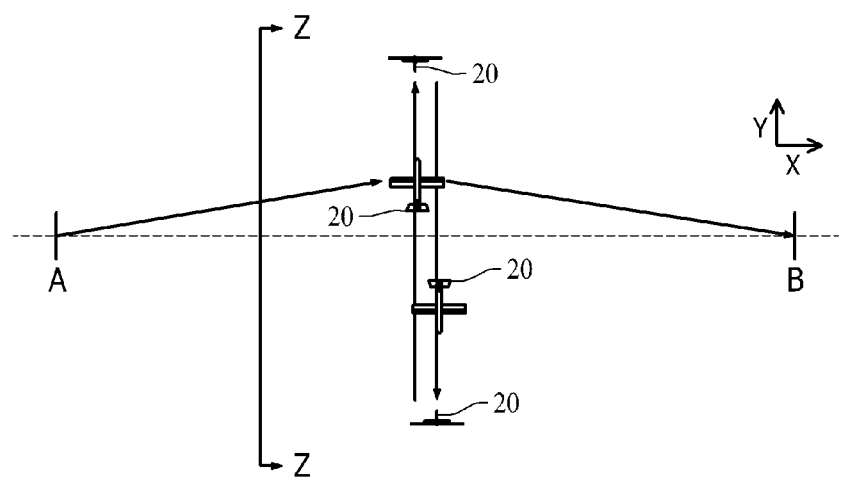
FIG. 14A is a top view illustrating the UAV performing a half loop, pitching through 180° and flying inverted along its return path perpendicular to the AB axis.
Figure 14B:
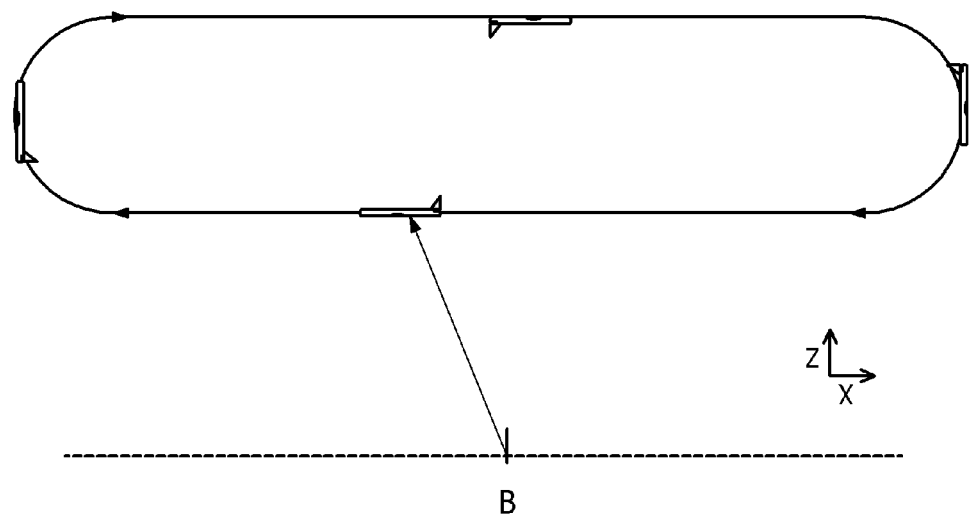
FIG. 14B is a section view illustrating the UAV performing a half loop, pitching through 180° and flying inverted along its return path perpendicular to the AB axis, looking from Z-Z along the A-B axis.

To solve this problem, in one embodiment, the UAV 20 performs a half loop, pitching through 180° and flying inverted along its return path perpendicular to the AB axis. At the other side of its pattern, the UAV 20 performs another half loop and flies right side up, which is shown in FIG. 14. With this pattern, the reflective device 10 is always properly oriented to give the maximal reflection from Point A to Point B. Alternatively, the UAV 20 may fly a vertical FIG. 8 pattern, pitching in the same direction (up or down) at each end of the path. Summarizing, FIG. 14A is a top view and FIG. 14B is a section view, looking from Z-Z along the A-B axis. UAV 20 pitches up at one end of the flight pattern and down at the other. The passive reflective device 10 in wing 30 is always horizontal and parallel to the A-B axis, thereby not becoming parallel to vertical E fields.

The example discussed herein is chosen for simplicity and clarity of illustration. The UAV 20 need not be halfway between Point A and Point B. If it is closer to Point A, say, then the UAV 20 may operate with one wing lower than the other and fly a curved path along the surface of the ellipsoid with foci at Point A and Point B. At every point on this path, the reflective device 10 in the wing 30 remains parallel to the surface of the ellipsoid and in the same plane as the A-B axis. As in the simpler example, the UAV 20 performs a half loop at each end of its flight pattern, but in this case the half loop is not strictly vertical; rather, the UAV 20 pitches in a direction perpendicular to the surface of the ellipsoid. A flight path with the UAV 20 continually climbing and descending and with its wings 30 continuously tilted is not fuel-efficient in still air, but a flight path like this may give the most efficient radio communication in some cases by reducing the effective range from Point A to Point B.

Method for Handling Crosswinds

Figure 15A:
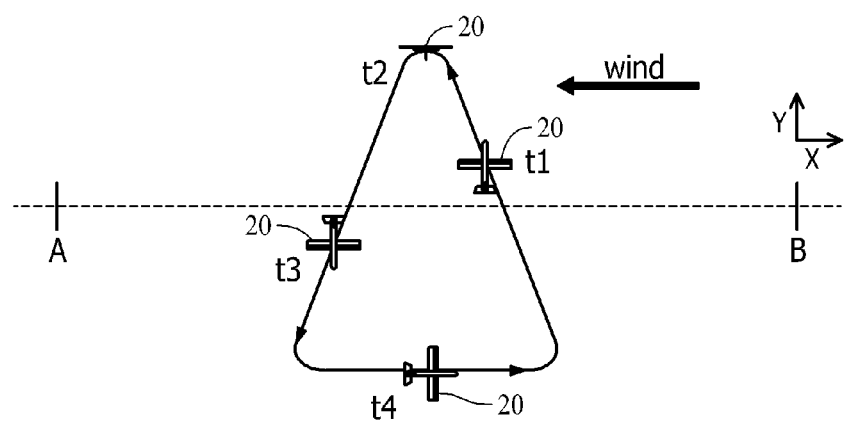
FIG. 15A illustrates that a single UAV must fly with a specified orientation, that a prolonged crosswind may blow the UAV out of position, and that correcting its position may require the UAV to briefly abandon its relay mission and fly upwind.
Figure 15B:
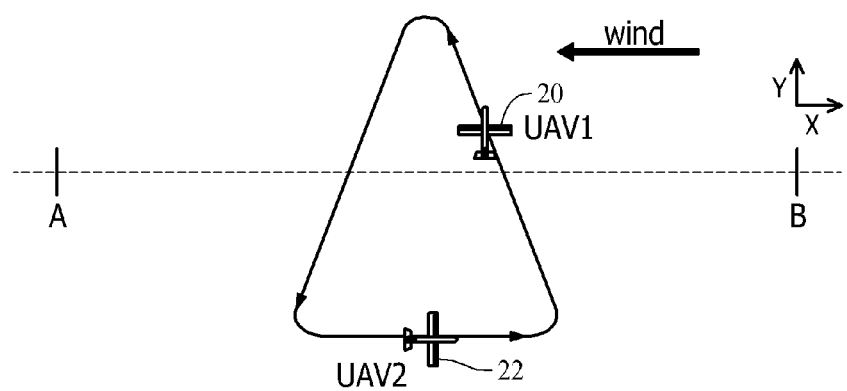
FIG. 15B illustrates an embodiment where multiple UAVs fly the same path, but with different timing so they remain out of phase with each other.

The methods described above assume that the UAV 20 flies in the direction it is pointed, for example, crosswind speeds are no more than a small fraction of the true airspeed of the UAV 20. In stronger winds, additional methods may be required. Unlike typical applications where an aircraft can "crab" into the wind to maintain a specified ground track, the UAV 20 must fly with a specified orientation to maintain an adequate bistatic scattering cross-section. As a result, a prolonged crosswind may blow the UAV 20 out of position. Correcting its position may require the UAV 20 to briefly abandon its relay mission and fly upwind, as shown in FIG. 15A. In some cases, a temporary loss of relay function is acceptable. In other cases, however, is necessary to use an embodiment with two or more UAVs 20, 22. The UAVs 20, 22 each fly the same path, but with different timing so they remain out of phase with each other, for example, while one UAV 20 is flying the upwind leg, another UAV 22 is in position to reflect signals from Point A to Point B as shown in FIG. 15B. Therefore, FIG. 15A illustrates a single UAV 20 shown at four points in time. At t4, it cannot provide strong reflection from Point A to Point B. FIG. 15B illustrates two UAVs 20, 22 at a single moment in time. At least one UAV 20, 22 is always in position to provide strong reflection.

The same two-UAV method is useful when Point A, Point B, or both are moving, for example, riding in vehicles. In that case, the wind may be zero, but the flow of air relative to Point A and Point B may be treated as equivalent to wind.

Note that the two-UAV method of FIG. 15B does not necessarily encumber any single user with a need to operate and maintain two separate UAVs 20, 22 in the field. Communication always occurs between at least two users, and it is reasonable for each military or civil unit with a radio (i.e. Point A, Point B, or their colleagues) to also support one small UAV 20. It is contemplated that the UAVs 20 suitable for performing the embodiments described herein are typically small enough to be disassembled and carried in a backpack, herein referred to as being man portable, along with an operator console and all needed maintenance equipment.

Method for Adjusting Polarization

Figure 16A:
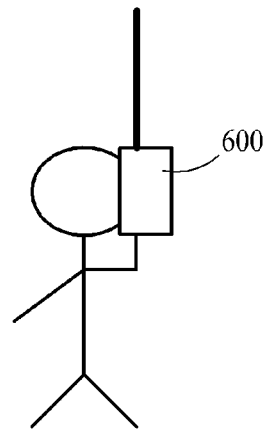
FIG. 16A illustrates a handheld radio which includes an antenna nominally designed to be held vertically.
Figure 16B:
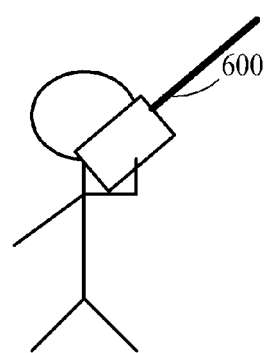
FIG. 16B illustrates the handheld radio and that the antenna is usually held at an angle.
Figure 16C:
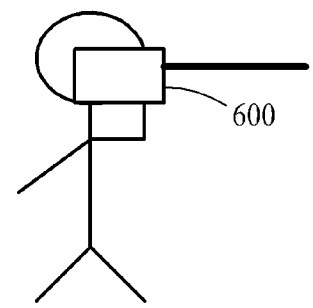
FIG. 16C illustrates that the handheld radio can be fairly easily rotated to produce horizontal polarization with the antenna.

As noted earlier, most mobile military radios nominally use vertical polarization. For some situations where users desire to apply the presently described embodiments, horizontal polarization might be more appropriate or easier to use because of constraints on the position or orientation of the UAV. It is easy to "convert" most military radios to horizontal polarization by the simple expedient of tilting or flexing the antenna. FIG. 16 illustrates how a handheld radio 600, nominally designed to be held vertically (FIG. 16A), in fact is usually held at an angle that produces diagonal polarization (FIG. 16B), and can be fairly easily rotated to produce horizontal polarization (FIG. 16C). Rotating to fully horizontal may not be necessary in most cases: diagonal polarization has a vertical component and a horizontal component, so diagonally polarized signals work reasonably well with methods for either vertical or horizontal polarization.

Figure 17A:
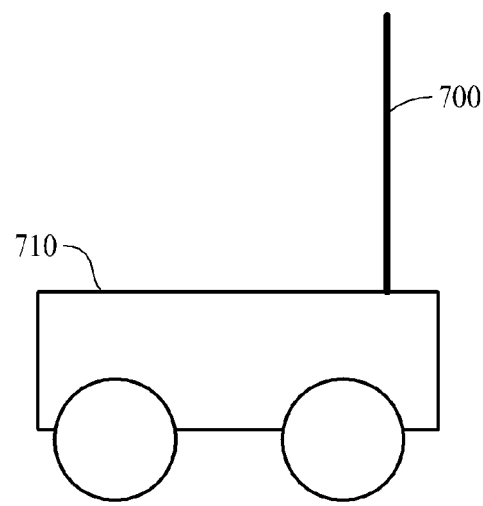
FIG. 17A illustrates a vertical whip antenna for a ground vehicle.
Figure 17B:
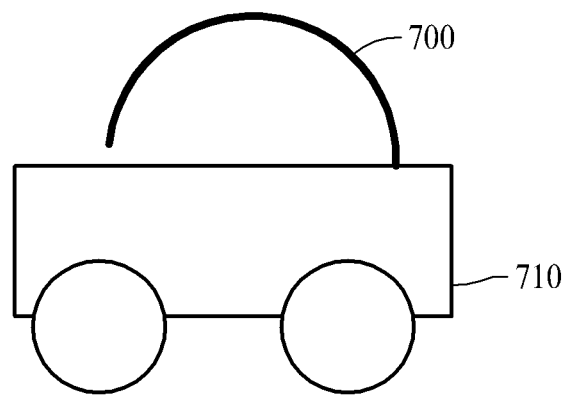
FIG. 17B illustrates that the antenna for the ground vehicle can be flexed to produce roughly horizontal polarization.

FIG. 17 illustrates how a whip antenna 700 for a ground vehicle 710, nominally designed to be mounted vertically (FIG. 17A), can be flexed to produce roughly horizontal polarization (FIG. 17B). Soldiers in the field frequently flex the antenna 700 and tie the tip to the chassis of vehicle 710 so the antenna is not damaged by collisions with trees or low bridges. This changes the principal polarization from vertical to horizontal.

In a typical military application, points A and B would be on opposite sides of a mountain reaching 3000 feet above local terrain with a roughly 45° slope on each side. The UAV 20 would fly a modest distance above the hilltop where it is visible to both points A and B. One analysis concluded that a UAV-mounted reflective device provided 15 dB of link margin for communications between points A and B. However, this analysis assumed certain parameters for the reflective wire and for the radio as illustrated in the table below. The described embodiments utilize a shorter wire that would fit within the wingspan of a hand-launched UAV 20, a thinner wire to reduce weight, and radio parameters corresponding to radios currently utilized at a data rate consistent with voice-only communications, as also shown in the Table.

| Parameter | Prior value | Current value | Change from 15 dB margin |
|---|---|---|---|
| Length of wire | 20 m | 2 m | −20 dB |
| Transmit power | 1 watt | 20 watt | +13 dB |
| Wire radius | 5 mm | 0.5 mm | −4.7 dB |

-continued

| Parameter | Prior value | Current value | Change from 15 dB margin |
|---|---|---|---|
| Frequency | 500 MHz | 1.8 GHz | +2.1 dB |
| Data rate | 250 kbps | 25 kbps | +10 dB |
| Total | | | +0.4 dB |

As shown, the result is a slight improvement in link margin from 15 dB to 15.4 dB. The central peak of the scattering pattern is 4.6° wide from null to null, or about 3.9° wide between the points where power drops 15 dB from the peak value. A UAV autopilot with rapid response in its roll control loop can keep the wings (including the passive reflective device) steady to within a 3.9° band more than 95% of the time under typical weather conditions. This is adequate availability for voice communication.

Further improvement in link margin may be attained by (a) using a hollow (or plastic-filled) wire with larger radius, but with the same weight as the wire described herein, and/or (b) using two or more wires parallel to each other and separated by a distance on the order of one wavelength. The latter solution imposes some pitch constraints on the UAV: both the nose-to-tail axis and the wing-to-wing axis must lie in the local ellipsoid passing through the UAV with foci at points A and B.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for relaying a radio signal between two points having an obstacle therebetween, said method comprising:
   maintaining an unmanned aerial vehicle (UAV) in an orientation with respect to the two points, the UAV including a wing and having at least one passive reflective device coupled to the wing or within the wing, the at least one passive reflective device having an elongated configuration, wherein a long axis of the at least one reflective device is oriented parallel to the wing;
   transmitting a signal from one of the two points, the transmitted signal impinging the at least one passive reflective device; and
   receiving the signal at the other of the two points, the received signal being a signal reflected from the at least one passive reflective device.

2. The method according to claim 1 wherein maintaining an UAV in an orientation with respect to the two points comprises flying one or more paths that optimize bistatic signal strength between the two points.

3. The method according to claim 1 further comprising associating the at least one passive reflective device with a wingspan of the UAV.

4. The method according to claim 1 further comprising mounting the at least one passive reflective device on the wing of the UAV or within a non-conductive wing of the UAV, the at least one passive reflective device including one of a strip, plate, or wire of material selected to reflect radio-frequency signals.

5. The method according to claim 1 wherein maintaining an UAV in an orientation with respect to the two points comprises one of
configuring a control system to control flight control surfaces of the UAV, the control system programmed with the locations of the two points and is configured to receive updates of the location and orientation of the UAV from at least one system that provides location and orientation information; and
operating a console control with a radio link to the UAV, with a human operator, the console control receiving information about locations of the two points and information regarding the location and orientation of the UAV.

6. The method according to claim 1 wherein maintaining an UAV in an orientation with respect to the two points comprises one of:
orienting the UAV so the long axis of the at least one passive reflective device lies on an ellipsoid whose foci are at the two points; and
for a substantially two-dimensional device, orienting the UAV so both the long axis and a short axis of the at least one passive reflective lie on an ellipsoid whose foci are at the two points.

7. The method according to claim 1 wherein maintaining an UAV in an orientation with respect to the two points comprises minimizing an equivalent range from a first of the two points to a second of the two points via the UAV.

8. The method according to claim 1 wherein maintaining an UAV in an orientation with respect to the two points comprises at least one of:
operating the UAV to perform a half loop at one end of its flight pattern and another half loop at the other end of the flight pattern, flying inverted along one of the paths between the ends of the flight pattern, such that the at least one passive reflective device is properly oriented for reflection of signals during the entire flight path; and
operating the UAV to fly a FIG. 8 flight pattern such that the UAV pitches in the same direction at both ends of the flight path, climbing between the ends in one portion of the flight pattern and descending between the ends during another portion of the flight pattern.

9. The method according to claim 1 wherein maintaining an UAV in an orientation with respect to the two points comprises maintaining the at least one passive reflective device in a substantially parallel orientation with respect to horizontal polarization vectors between the two points.

10. The method according to claim 1 wherein maintaining an UAV in an orientation with respect to the two points comprises maintaining the at least one passive reflective device in an orientation such that a product of a square of the cosine of a first angle between the at least one passive reflective device and a vertical incident polarization vector between the two points and a square of the cosine of a second angle between the at least one passive reflective device and a vertical scattered polarization vector between the two points is maximized.

11. The method according to claim 1 wherein maintaining an UAV in an orientation with respect to the two points comprises operating a plurality of UAVs such that at least one of the UAVs is always oriented such that the long axis of the at least one passive reflective device disposed thereon lies on an ellipsoid whose foci are at the two points.

12. An unmanned aerial vehicle (UAV) comprising:
a wing;
at least one passive reflective device coupled to said wing or within said wing, said at least one passive reflective device having an elongated configuration thereon defining a long axis and comprising a material configured to reflect radio signals, the long axis of said at least one passive reflective device oriented parallel to said wing; and
a control system to control flight control surfaces of said UAV such that said UAV has a flight pattern that orients said at least one passive reflective device such that said long axis lies on an ellipsoid whose foci are at two points between which radio communications are desired.

13. The UAV according to claim 12 wherein said at least one passive reflective device comprises at least one of a strip, a plate, or a wire extending between tips of said wing.

14. The UAV according to claim 12 wherein said control system is programmed to receive updates of the location of the two points and updates of the location and orientation of the UAV from at least one system that provides location and orientation information.

15. A communications system comprising:
a first radio transceiver operable for deployment at a first point;
a second radio transceiver operable for deployment at a second point; and
an unmanned aerial vehicle (UAV) comprising a wing and at least one passive reflective device coupled to said wing or within said wing, said at least one passive reflective device having an elongated configuration, said at least one passive reflective device defining a long axis and comprising a material configured to reflect radio signals, the long axis of said at least one passive reflective device oriented parallel to said wing, said unmanned aerial vehicle operable to maintain an orientation of said at least one passive reflective device with respect to said first radio transceiver and said second radio transceiver.

16. The communications system according to claim 15 wherein said UAV is operable to maintain a flight pattern that orients said at least one passive reflective device such that the long axis lies on an ellipsoid whose foci are the first point and the second point.

17. The communications system according to claim 16 wherein said UAV comprises a plurality of said UAVS, said UAVs operable to maintain flight patterns that ensures that the said at least one passive reflective device associated with at least one of said UAVs is always oriented such that the long axis lies on an ellipsoid whose foci are the first point and the second point.

18. The communications system according to claim 15 wherein said UAV comprises a size such that said UAV is man portable.

19. The communications system according to claim 15 wherein said at least one passive reflective device comprises at least one of one of a strip, a plate, or a wire extending between tips of a wing of said UAV.

20. A method, comprising:
transmitting a radio signal from a first point, the radio signal intended for reception at a second point, an obstacle to radio signals between the first point and the second point;
orienting at least one passive reflective device having an elongated configuration with respect to the first point and the second point using an unmanned aerial vehicle including a wing, wherein the at least one passive reflective device is oriented parallel to the wing;

reflecting the radio signal with the at least one passive reflective device; and
receiving the radio signal at the second point.

\* \* \* \* \*